Patented Sept. 24, 1940

2,215,885

UNITED STATES PATENT OFFICE 2,215,885

REGENERATION OF SPENT CATALYSTS

Otto Roelen, Oberhausen-Holten, and Franz Hanisch, Duisburg-Hamborn, Germany, assignors, by mesne assignments, to Hydrocarbon Synthesis Corporation, Linden, N. J.

No Drawing. Application September 17, 1938, Serial No. 230,510. In Germany September 25, 1937

3 Claims. (Cl. 23—238)

Our invention relates to the regeneration of spent catalysts used in the synthetic production of benzine from carbon monoxide and hydrogen and more especially to the treatment of catalysts which contain cobalt.

It is an object of our invention to recover valuable constituents from spent cobalt catalysts used in the catalytic hydrogenation of carbon monoxide.

It is another object of our invention to provide for the separation, in a convenient form, of kieselguhr and cobalt compounds recovered from such spent catalysts.

Other objects of our invention will appear as the specification proceeds.

In the synthetic production of benzine from mixtures of carbon monoxide and hydrogen it is known to use catalysts prepared by precipitating catalytically active metals in the presence of kieselguhr. Although these catalysts are active for a rather long period of time, they absorb, in the course of the synthesis, substantial quantities of difficultly volatile organic substances which gradually reduce the efficiency of the catalysts so that after some time the catalysts must be regenerated by dissolving them in acids and precipitating the catalytically active constituents.

In the case of catalysts which contain a substantial percentage of cobalt as active principle, the expert is induced to employ in this treatment highly concentrated nitric acid in order to obtain solutions of cobalt as highly concentrated as possible. This mode of operation however involves the drawback that the concentrated solution of cobalt salts contains the kieselguhr suspended in so fine a state of division that expensive and entirely specific means are required for the separation of the kieselguhr from the liquor.

We have now discovered that this drawback can be overcome and that the kieselguhr which was contained in the catalyst, settles down within a short time and in such manner that it can easily be separated from the cobalt solution, if the spent catalysts are treated with dilute nitric acid. An aqueous acid solution containing about from 3 to 5 per cent free nitric acid has been found to be particularly favorable, while an acid containing more than 20 per cent nitric acid should be avoided by all means.

We have further found it particularly suitable to use for the dissolving treatment of the catalyst an acid of the concentration mentioned above which already contains a considerable percentage of cobalt nitrate. Such a dissolving liquor may for instance be obtained by adding to a concentrated solution of cobalt nitrate the necessary quantity of nitric acid. We prefer to add continuously or gradually to the dissolving liquor such quantities of the acid required for dissolving the whole of the cobalt in the form of concentrated nitric acid that the content of the liquor in free nitric acid remains for instance within the limits of 3 to 5 per cent.

The dissolving treatment is preferably carried out at temperatures ranging between 70 and 90° C., however in any case at a temperature above the melting point of the paraffins which are formed in the course of the benzine synthesis and are contained in the catalyst mass. The dissolving operation is promoted by slight stirring; vigorous stirring should be avoided. The solution can easily be separated from the kieselguhr by decanting or simply filtering. After the solution has cooled down, the paraffin separates under the form of a solid paraffin cake.

Example 6.9 kg. of a spent cobalt catalyst containing 55% paraffin, 15% cobalt, 2% thorium oxide, 27% kieselguhr and 1% moisture, corresponding to a content of 1.0 kg. cobalt, are added to 100 liters of a solution of cobalt nitrate which contains 68 gr. cobalt and 50 gr. free nitric acid per liter. In the course of 20 minutes there are added to the mixture under slight stirring 4 liters nitric acid of 50% in small fractions so that the content of free nitric acid of the solution does not exceed 50 gr. per liter. The temperature is maintained at 88° C. The cobalt is completely dissolved after the lapse of two hours, whereupon the reaction mixture is allowed to settle during half an hour, whereby the kieselguhr separates in sandy form and may be withdrawn from the dissolving vessel together with a part of the adhering cobalt solution from which it is separated by filtration after cooling. The kieselguhr is then washed with distilled water. The washed kieselguhr contains only small traces of cobalt and thorium. After the cobalt solution which remained over in the dissolving vessel has cooled down, the paraffin which floated on the solution as an oily layer, separates as a solid layer. This paraffin is withdrawn from time to time and purified by remelting and washing. The wash waters are conducted into the dissolving vessel. Part of the cobalt solution withdrawn from the vessel is used for the preparation of fresh catalysts, while the remainder is employed for dissolving fresh quantities of catalysts.

Various changes may be made in the details disclosed in the foregoing specification without departing from the invention or sacrificing the advantages thereof.

We claim:

1. The method of recovering cobalt values from catalysts prepared by precipitating compounds of cobalt onto kieselguhr, which catalysts have been employed in the synthetic production of benzine from carbon monoxide and hydrogen whereby a paraffinic deposit has been produced on said catalysts, which comprises treating the catalyst with a solution containing nitric acid until the cobalt is dissolved, said solution containing throughout the process a concentration within the range of approximately 3 to approximately 5 percent $HNO_3$, and separating the kieselguhr from the solution containing the dissolved cobalt.

2. The method of claim 1, wherein the nitric acid employed contains catalytically active constituents of the catalyst in solution.

3. The method of claim 1, wherein the nitric acid employed contains a high percentage of cobalt nitrate.

OTTO ROELEN.
FRANZ HANISCH.